United States Patent
Um

(10) Patent No.: US 8,896,515 B2
(45) Date of Patent: Nov. 25, 2014

(54) BACKLIGHT APPARATUS AND LIQUID CRYSTAL DISPLAY APPARATUS HAVING THE SAME

(75) Inventor: Jae-Eun Um, Cheonan-si (KR)

(73) Assignee: Samsung Display Co., Ltd. (KR)

( * ) Notice: Subject to any disclaimer, the term of this patent is extended or adjusted under 35 U.S.C. 154(b) by 1288 days.

(21) Appl. No.: 12/128,085

(22) Filed: May 28, 2008

(65) Prior Publication Data

US 2009/0109164 A1 Apr. 30, 2009

(30) Foreign Application Priority Data

Oct. 31, 2007 (KR) ........................ 10-2007-0110594

(51) Int. Cl.
*G09G 3/36* (2006.01)
*H05B 41/282* (2006.01)
*G02F 1/1335* (2006.01)

(52) U.S. Cl.
CPC ............ *H05B 41/282* (2013.01); *Y02B 20/183* (2013.01); *G02F 2001/133612* (2013.01)
USPC ..................................... 345/102; 340/538.16

(58) Field of Classification Search
USPC ................................... 345/87–104, 204–215
See application file for complete search history.

(56) References Cited

U.S. PATENT DOCUMENTS

| | | | |
|---|---|---|---|
| 7,304,633 B2 * | 12/2007 | Kim et al. | 345/102 |
| 7,492,106 B2 * | 2/2009 | Sengoku et al. | 315/276 |
| 2003/0001524 A1 * | 1/2003 | Lin et al. | 315/312 |
| 2004/0125071 A1 * | 7/2004 | Kim et al. | 345/102 |
| 2004/0252481 A1 * | 12/2004 | Moon | 362/31 |
| 2006/0290453 A1 * | 12/2006 | Park et al. | 336/69 |
| 2007/0040517 A1 * | 2/2007 | Yu | 315/291 |
| 2007/0120503 A1 * | 5/2007 | Zhou et al. | 315/291 |
| 2007/0241694 A1 * | 10/2007 | Okamatsu | 315/307 |
| 2008/0001555 A1 * | 1/2008 | Lu et al. | 315/307 |
| 2008/0036400 A1 * | 2/2008 | Lu et al. | 315/320 |
| 2008/0088257 A1 * | 4/2008 | Zhou et al. | 315/291 |
| 2008/0122387 A1 * | 5/2008 | Chien | 315/307 |
| 2008/0315785 A1 * | 12/2008 | Price et al. | 315/277 |

FOREIGN PATENT DOCUMENTS

| | | |
|---|---|---|
| KR | 1020040106047 A | 12/2004 |
| KR | 1020050081938 A | 8/2005 |

* cited by examiner

*Primary Examiner* — Christopher E Leiby
(74) *Attorney, Agent, or Firm* — Cantor Colburn LLP

(57) ABSTRACT

A backlight apparatus includes a first backlight part and a second backlight part. The first backlight part includes a plurality of first lamps. The second backlight part includes a plurality of second lamps. At least one first lamp of the first lamps is disposed between two second lamps of the second lamps.

8 Claims, 8 Drawing Sheets

FIG. 2
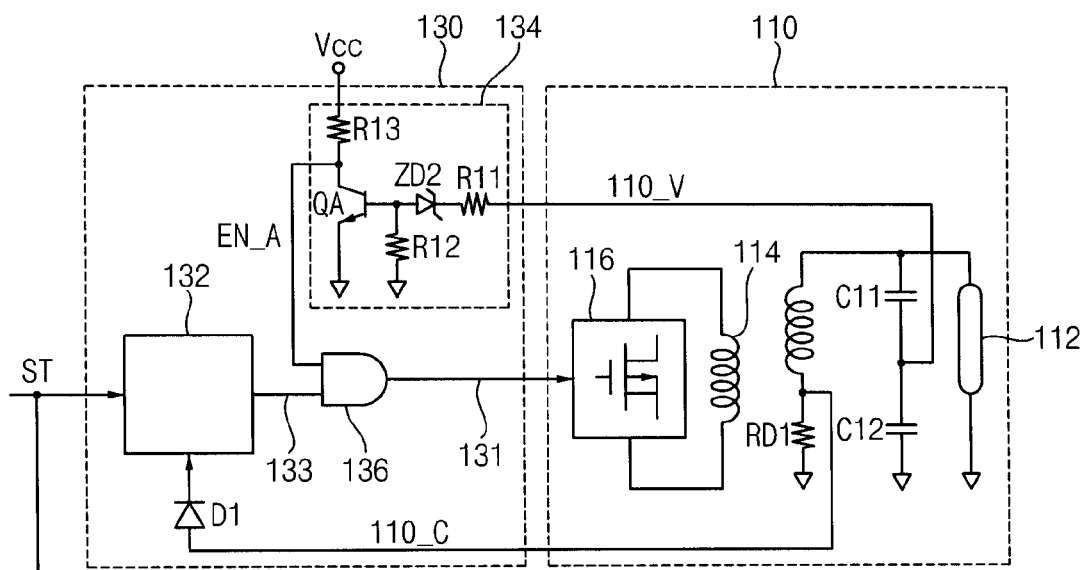
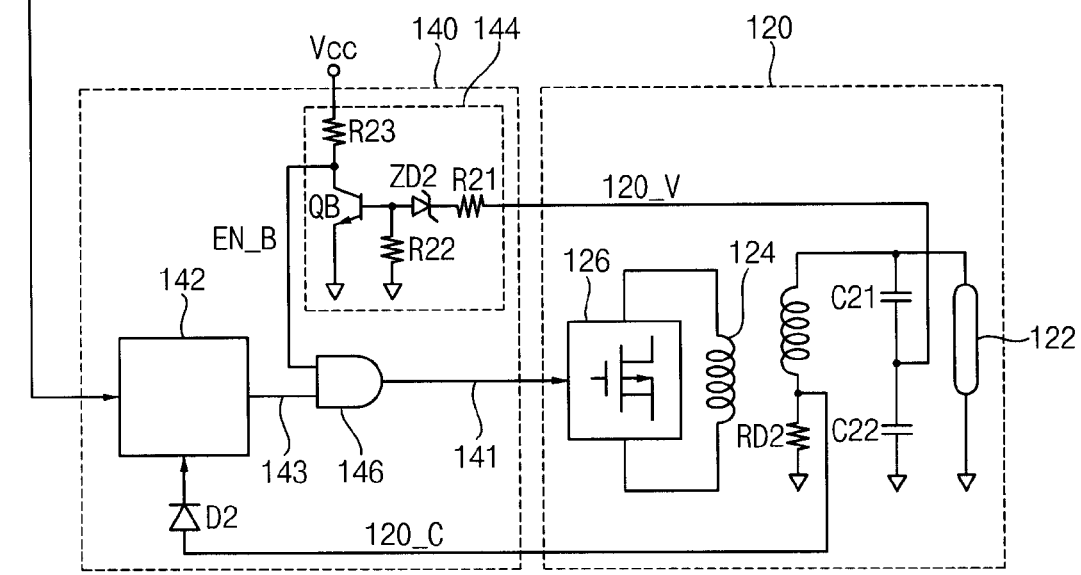

BACKLIGHT APPARATUS AND LIQUID CRYSTAL DISPLAY APPARATUS HAVING THE SAME

This application claims priority to Korean Patent Application No. 2007-110594, filed on Oct. 31, 2007, and all the benefits accruing therefrom under 35 U.S.C. §119, the contents of which in its entirety are herein incorporated by reference.

BACKGROUND OF THE INVENTION

1. Field of the Invention

The present invention relates to a backlight apparatus and a liquid crystal display ("LCD") apparatus having the backlight apparatus. More particularly, the present invention relates to a backlight apparatus which maintains an operation thereof when a backlight part is damaged, and an LCD apparatus having the same.

2. Description of the Related Art

In general, a display apparatus displays images by converting electronic data processed by an information processing apparatus into a visible image. Types of display apparatus include a cathode ray tube ("CRT"), a plasma display panel ("PDP"), a liquid crystal display ("LCD") and an organic electro-luminescent ("EL") display, for example.

A typical LCD apparatus displays images using liquid crystals, electrical and optical characteristics of which vary in response to an electric field applied thereto. The LCD apparatus has been widely used in various electronic apparatuses, because the LCD apparatus has many advantages, such as being light weight, thin, and having low power consumption, for example, in comparison with other types of display apparatuses.

However, the LCD apparatus is a non-emissive type display apparatus, and therefore requires a separate light source, such as a backlight assembly, to supply an LCD panel of the LCD apparatus with light. As a result, a typical LCD apparatus employs a light source, such as a cold cathode fluorescent lamp ("CCFL") or a flat fluorescent lamp ("FFL"), for example, which emits light.

The LCD apparatus may further include a backlight apparatus which is used, for example, in a television receiver set or a monitor. In this case, the backlight apparatus typically includes at least two backlight parts controlled by a block unit. Each of the at least two backlight parts includes at least two lamps, and receives a feedback signal to prevent damage to the backlight part when one of the at least two lamps disposed therein malfunctions, e.g., breaks or opens.

At least ten lamps are typically used in a direct-illumination type backlight apparatus. Specifically, five lamps are typically disposed a first backlight part, and a remaining five lamps are thereby disposed in a second backlight part. When any one of the at least ten lamps opens or breaks, the backlight apparatus shuts down to prevent damage thereto. More specifically, when an error is generated in any one of two backlight parts having a common error signal, the backlight part having the error is shutdown as is a remaining, e.g., unaffected, backlight part, to protect an inverter of the backlight apparatus.

Thus, in a monitor, for example, utilizing the inverter protecting method described above, the unaffected backlight part, e.g., the backlight part which does not have the error, is shut down by the common signal. Therefore, a problem exists in that when one backlight part has an error, both backlight parts are shut down, and thereafter no light is provided to the LCD panel disposed in the LCD apparatus for the monitor.

BRIEF SUMMARY OF THE INVENTION

An exemplary embodiment of the present invention provides a backlight apparatus which maintains normal operation of non-malfunctioning backlight parts when another backlight part malfunctions, e.g., is damaged or opened.

Alternative exemplary embodiments of the present invention also provide a liquid crystal display apparatus having the backlight apparatus.

In an exemplary embodiment of the present invention, a backlight apparatus includes a first backlight part, a second backlight part and a backlight controller. The first backlight part includes a plurality of first lamps. The second backlight part includes a plurality of second lamps. At least one first lamp of the first backlight part is disposed between two second lamps of the second backlight part. The backlight controller drives independently the first backlight part and the second backlight part by providing a first driving signal and a second driving signal, respectively. The backlight controller drives the first backlight part and the second backlight part such that one of the first backlight part and the second backlight part remains operational even when the other backlight part is shut down.

First lamps of the first lamps of the first backlight part and the second lamps of the second backlight part may be disposed in an alternating arrangement.

The backlight controller may provide the first backlight part with the first driving signal based on a first feedback signal provided from the first backlight part, and may also provide the second backlight part with the second backlight signal based on a second feedback signal provided from the second backlight part. In an exemplary embodiment, the feedback signal includes a voltage feedback signal and a current feedback signal.

In an exemplary embodiment, the first backlight part and the second backlight part are driven independently from each other.

In an alternative exemplary embodiment of the present invention, a liquid crystal display ("LCD") apparatus includes an LCD section and a backlight apparatus. The LCD section displays an image using a liquid crystal layer. The backlight apparatus includes a first backlight part having a plurality of first lamps, a second backlight part having a plurality of second lamps, and a backlight controller. At least one first lamp of the first backlight part is disposed between two second lamps of the second backlight part. The backlight controller drives independently the first backlight part and the second backlight part by providing a first driving signal and a second driving signal, respectively. The backlight controller drives the first backlight part and the second backlight part such that one of the first backlight part and the second backlight part remains operational even when the other backlight part is shut down.

According to an exemplary embodiment, in the backlight apparatus and the LCD apparatus having the backlight apparatus, lamps disposed in different backlight parts are disposed in an alternating arrangement, and a backlight part normally operates, even when a lamp of another backlight part malfunctions, e.g., opens or is broken, which results in a shut down of the backlight part having the opened or broken lamp.

BRIEF DESCRIPTION OF THE DRAWINGS

The above and other aspects, features and advantages of the present invention will become more readily apparent by describing in further detail exemplary embodiments thereof with reference to the accompanying drawings, in which:

FIG. 2 is a schematic diagram of the backlight apparatus according to the exemplary embodiment of the present invention shown in FIG. 1;

DETAILED DESCRIPTION OF THE INVENTION

Figure 1:
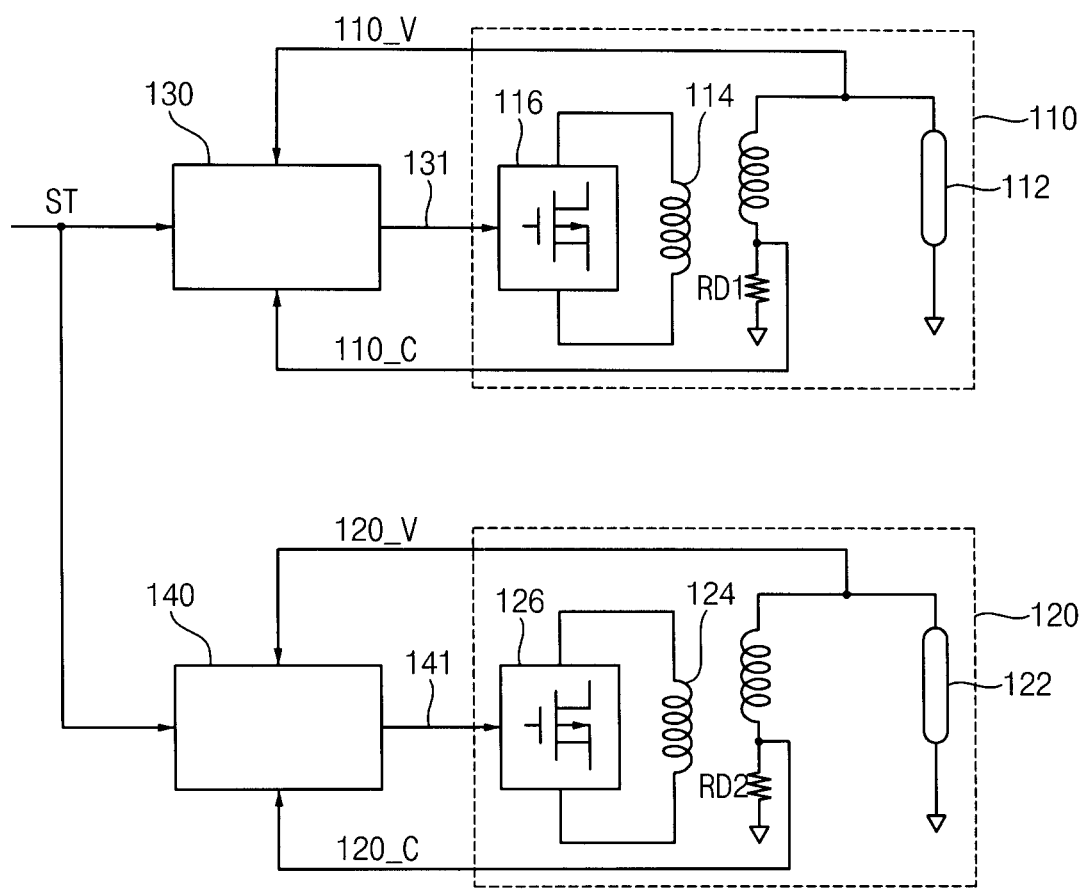
FIG. 1 is a block diagram of a backlight apparatus according to an exemplary embodiment of the present invention.

The invention will now be described more fully hereinafter with reference to the accompanying drawings, in which exemplary embodiments of the invention are shown. The present invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Furthermore, relative terms, such as "lower" or "bottom" and "upper" or "top" may be used herein to describe one element's relationship to other elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on the "upper" side of the other elements. The exemplary term "lower" can, therefore, encompass both an orientation of "lower" and "upper," depending upon the particular orientation of the figure. Similarly, if the device in one of the figures were turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning which is consistent with their meaning in the context of the relevant art and the present disclosure, and will not be interpreted in an idealized or overly formal sense unless expressly so defined herein.

Exemplary embodiments of the present invention are described herein with reference to cross section illustrations which are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes which result, for example, from manufacturing. For example, a region illustrated or described as flat may, typically, have rough and/or nonlinear features. Moreover, sharp angles which are illustrated may be rounded. Thus, the regions illustrated in the figures are schematic in nature and their shapes are not intended to illustrate the precise shape of a region and are not intended to limit the scope of the present invention.

Hereinafter, exemplary embodiments of the present invention will be described in further detail with reference to the accompanying drawings. FIG. 1 is a block diagram of a backlight apparatus 100 according to an exemplary embodiment of the present invention.

Referring to FIG. 1, the backlight apparatus 100 includes a first backlight part 110, a second backlight part 120, a first backlight controller 130 and a second backlight controller 140.

The first backlight part 110 includes at least one first lamp 112, a first transformer part 114 and a first power providing part 116, and outputs light based on a first driving signal 131 provided to the first power providing part 116 from the first backlight controller 130.

In an exemplary embodiment, a first terminal of the first lamp 112 is electrically connected to a first terminal of a secondary coil of the first transformer 114, while a second opposite terminals of the first lamp 112 is electrically connected to ground, as shown in FIG. 1. Terminals of a primary coil of the first transformer 114 are electrically connected to the first power providing part 116. A second terminal of the secondary coil of the first transformer 114 is electrically connected to ground through a first detecting resistor RD1. In an exemplary embodiment, the first power providing part 116 includes a plurality of metal-oxide semiconductor ("MOS") transistors electrically connected in a full-bridge type circuit (not shown), for example.

The second backlight part 120 includes a second lamp 122, a second transformer part 124 and a second power providing part 126, and emits light based on a second driving signal 141 provided to the second power providing part 126 from the second backlight controller 140.

In an exemplary embodiment, a first terminal of the second lamp 122 is electrically connected to a first terminal of a secondary coil of the second transformer part 124, and a second terminal of the second lamp 122 is electrically connected to ground. Two terminals of a primary coil of the second transformer part 124 are electrically connected to the second power providing part 126. A second terminal of the secondary coil of the second transformer part 124 is electrically connected to ground through a second detecting resistor RD2. The second power providing part 126 includes a plurality of MOS transistors connected to each other in, e.g., a full-bridge type circuit (not shown) but alternative exemplary embodiments are not limited thereto.

The first backlight controller 130 provides the first backlight part 110 with the first driving signal 131 based on a start signal ST provided from an external device (not shown) and first feedback signals provided from the first backlight part 110. The first feedback signals include a first voltage feedback signal 110_V and a first current feedback signal 110_C. The first voltage feedback signal 110_V is detected at a node between the first terminal of the secondary coil of the first transformer part 114 and the first lamp 112. The first current feedback signal 110_C is detected at a node between the second terminal of the secondary coil of the first transformer part 114 and the first detecting resistor RD1.

The second backlight controller 140 provides the second backlight part 120 with the second driving signal 141 based on the start signal ST and second feedback signals provided from the second backlight part 120. The second feedback signals include a second voltage feedback signal 120_V and a second current feedback signal 120_C. The second voltage feedback signal 120_V is detected at a node between the first terminal of the secondary coil of the second transformer part 124 and the second lamp 122. The second current feedback signal 120_C is detected at a node between the second terminal of the secondary coil of the second transformer part 124 and the second detecting resistor RD2.

Thus, as described above in greater detail, the first backlight part 110 and the second backlight part 120 are independently driven, e.g., are driven independently from each other. Therefore, when a lamp such as the first lamp 112 or the second lamp 122 malfunctions, e.g., is opened or damaged, the backlight part corresponding to the opened or damaged lamp is shut down, while the remaining backlight part operates normally. For example, when the first lamp 112 is opened or damaged, the first backlight part 110 is shut down, while the second backlight part 120 continues to operate. Conversely, when the second lamp 122 is opened or damaged, the second backlight part 120 is shut down, while the first backlight part 110 continues to operate FIG. 2 is a schematic diagram of the backlight apparatus 100 according to the exemplary embodiment of the present invention shown in FIG. 1.

The same reference numerals will be used to refer to parts in FIG. 2 which correspond to the same or like parts in FIG. 1, described above in greater detail, and any repetitive description thereof will be omitted. Referring to FIG. 2, the backlight apparatus 100 includes the first backlight part 110, the second backlight part 120, the first backlight controller 130 and the second backlight controller 140.

The first backlight part 110 includes at least one of the first lamps 112, the first transformer part 114 and the first power providing part 116. A first capacitor C11 and a second capacitor C12 connected in electrical series to the first capacitor C11 are connected in electrical parallel to both the secondary coil of the first transformer part 114 and the first lamp 112. The first voltage feedback signal 110_V is detected at a node between the first capacitor C11 and the second capacitor C12 and is provided to the first backlight controller 130.

The second backlight part 120 includes at least one of the second lamps 122, the second transformer part 124 and the second power providing part 126. A third capacitor C21 and a fourth capacitor C22 connected in electrical series to the third capacitor C21 are connected in electrical parallel to both the secondary coil of the second transformer part 124 and the second lamp 122. The second voltage feedback signal 120_V is detected at a node between the third capacitor C21 and the fourth capacitor C22 and is provided to the second backlight controller 140, as shown in FIG. 2.

The first backlight controller 130 provides the first backlight part 110 with the first driving signal 131 based on the start signal ST provided from the external device (not shown) and the first feedback signals provided from the first backlight part 110. As described above, the first feedback signals include the first voltage feedback signal 110_V and the first current feedback signal 110_C. More specifically, in an exemplary embodiment, the first backlight controller 130 includes a first backlight inverter integrated chip ("IC") 132, a first feedback signal detecting part 134 and a first AND gate 136.

The first backlight inverter IC 132 receives the start signal ST provided from the external device and the first current feedback signal 110_C provided from the first backlight part 110 through a first diode D1, and provides the first AND gate 136 with a first driving control signal 133. The first driving control signal 133 may include a pulse width modulation ("PWM") signal, for example, but alternative exemplary embodiments of the present invention are not limited thereto.

The first feedback signal detecting part 134 includes a first resistor R11, a first zener diode ZD1, a second resistor R12, a first bipolar junction transistor ("BJT") QA and a third resistor R13, and provides the first AND gate 136 with a first enable signal EN_A corresponding to the first voltage feedback signal 110_V provided from the first backlight part 110.

The first resistor R11 includes a first terminal electrically connected to the node between the first capacitor C11 and the second capacitor C12, e.g., at the node where the first voltage feedback signal 110_V is detected, and a second terminal electrically connected to a cathode of the first zener diode ZD1. An anode of the first zener diode ZD1 is electrically connected to a first terminal of the second resistor R12. A second terminal of the second resistor R12 is electrically connected to ground. The first BJT QA includes a base electrically connected to the anode of the first zener diode ZD1, an emitter electrically connected to ground, and a collector electrically connected to a first terminal of the third resistor R13 and the first AND gate 136. A second terminal of the third resistor R13 receives a constant voltage Vcc.

When a first voltage feedback signal 110_V having a low level is applied to the first BJT QA through the first zener diode ZD1, the first BJT QA is turned off. Therefore, the constant voltage Vcc is provided to the first AND gate 136 through the third resistor R13 connected to the collector of the first BJT QA, and the first AND gate 136 thereby outputs the first driving signal 131 at a high level.

When a first voltage feedback signal 110_V of a high level is applied to the first BJT QA through the first zener diode ZD1, the first BJT QA is turned on and the constant voltage Vcc is applied to ground through the third resistor R13. Thus, a ground voltage, e.g., a low level voltage is applied to the first AND gate 136 connected to the collector of the first BJT QA, and the first AND gate 136 thereby outputs the first driving signal 131 at a low level.

Thus, the first AND gate 136 performs an AND operation on the first driving control signal 133 provided from the first backlight inverter IC 132 and the first enabling signal EN_A provided from the first feedback signal detecting part 134 to provide the first power providing part 116 of the first backlight part 110 with the first driving signal 131.

Still referring to FIG. 2, the second backlight controller 140 provides the second backlight part 120 with the second driving signal 141 based on the start signal ST and the second feedback signals provided from the second backlight part 120. The second feedback signals include the second voltage feedback signal 120_V and the second current feedback signal 120_C.

In an exemplary embodiment, the second backlight controller 140 includes a second backlight inverter IC 142, a second feedback signal detecting part 144 and a second AND gate 146.

The second backlight inverter IC 142 receives the start signal ST provided from the external device (not shown) and the second current feedback signal 120_C provided from the second backlight part 120 through a second diode D2 to provide the second AND gate 146 with a second driving control signal 143. In an exemplary embodiment, the second driving control signal 143 includes a PWM signal, but is not limited thereto.

The second feedback signal detecting part 144 includes a fourth resistor R21, a second zener diode ZD2, a fifth resistor R22, a second BJT QB and a sixth resistor R23, and provides the second AND gate 146 with a second enable signal EN_B corresponding to the second voltage feedback signal 120_V detected in the second backlight part 120.

The fourth resistor R21 has a first terminal connected to a node between the third capacitor C21 and the fourth capacitor C22, e.g., the node where the second voltage feedback signal 120_V is detected, and a second terminal connected to a cathode of the second zener diode ZD2. An anode of the second zener diode ZD2 is connected to a first terminal of the fifth resistor R22. A second terminal of the fifth resistor R22 is electrically connected to ground. The second BJT QB includes a base connected to the anode of the second zener diode ZD2, an emitter electrically connected to ground, and a collector connected to a first terminal of the sixth resistor R23 and the second AND gate 146. A second terminal of the sixth resistor R23 receives the constant voltage Vcc.

When the second voltage feedback signal 120_V at a low level is provided to the second BJT QB through the second zener diode ZD2, the second BJT QB is turned off. Thus, the constant voltage Vcc is supplied by the sixth resistor R23 to the second AND gate 146 connected to the collector of the BJT QB, and the second AND gate 146 thereby outputs the second driving signal 141 at a high level.

When the second voltage feedback signal 120_V at a high level is provided to the second BJT QB through the second zener diode ZD2, the second BJT QB is turned on, and the constant voltage Vcc is applied to ground via the sixth resistor R23. Thus, a ground voltage, e.g., a low level voltage is thereby provided to the second AND gate 146 connected to the collector of the second BJT QB, and the second AND gate 146 thereby outputs the second driving signal 141 at a low level.

Thus, the second AND gate 146 performs an AND operation on the second driving control signal 143 provided from the second backlight inverter IC 142 and the second enabling signal EN_B provided from the second feedback signal detecting part 144 to provide the second power providing part 126 of the second backlight part 120 with the second driving signal 141.

In operation, a level of the first voltage feedback signal 110_V is increased when at least one of the first lamps 112 malfunctions, e.g., is opened or broken.

When the first voltage feedback voltage 110_V having the increased level is greater than a zener voltage Vz of the first zener diode ZD1, the first BJT QB is turned on and a voltage level of the first enable signal EN_A thereby shifts to a low level.

Accordingly, the first AND gate 136 outputs the first driving signal 131 at a low level, and the first backlight part 110 having the opened or broken first lamp 112 is thereby shut down.

Likewise, when at least one of the second lamps 122 malfunctions, e.g., is opened or broken, a level of the second voltage feedback signal 120_V increases.

When the second voltage feedback voltage 120_V having the increased level is greater than a zener voltage Vz of the second zener diode ZD2, the second BJT QB is turned on and a voltage level of the second enable signal EN_B is thereby shifted to a low level.

Accordingly, the second AND gate 146 outputs the second driving signal 141 at a low level, and the second backlight part 120 having an opened or broken second lamp 122 is shut down.

In an exemplary embodiment, the first feedback signal detecting part 134 and the first AND gate 136 are separate from the first backlight inverter IC 132. However, in an alternative exemplary embodiment, the first feedback signal detecting part 134 and the first AND gate 136 may be integrally formed (not shown) in the first backlight inverter IC 132.

Similarly, the second feedback signal detecting part 144 and the second AND gate 146 are separate from the second backlight inverter IC 142. However, the second feedback signal detecting part 144 and the second AND gate 146 may be integrally formed in the second backlight inverter IC 142.

In the backlight apparatus 100 according to an exemplary embodiment of the present invention, the first backlight controller 130 and the second backlight controller 140 include a zener diode, a BJT and an AND gate. Therefore, a manufacturing cost for the backlight apparatus 100 is substantially decreased.

Figure 3:
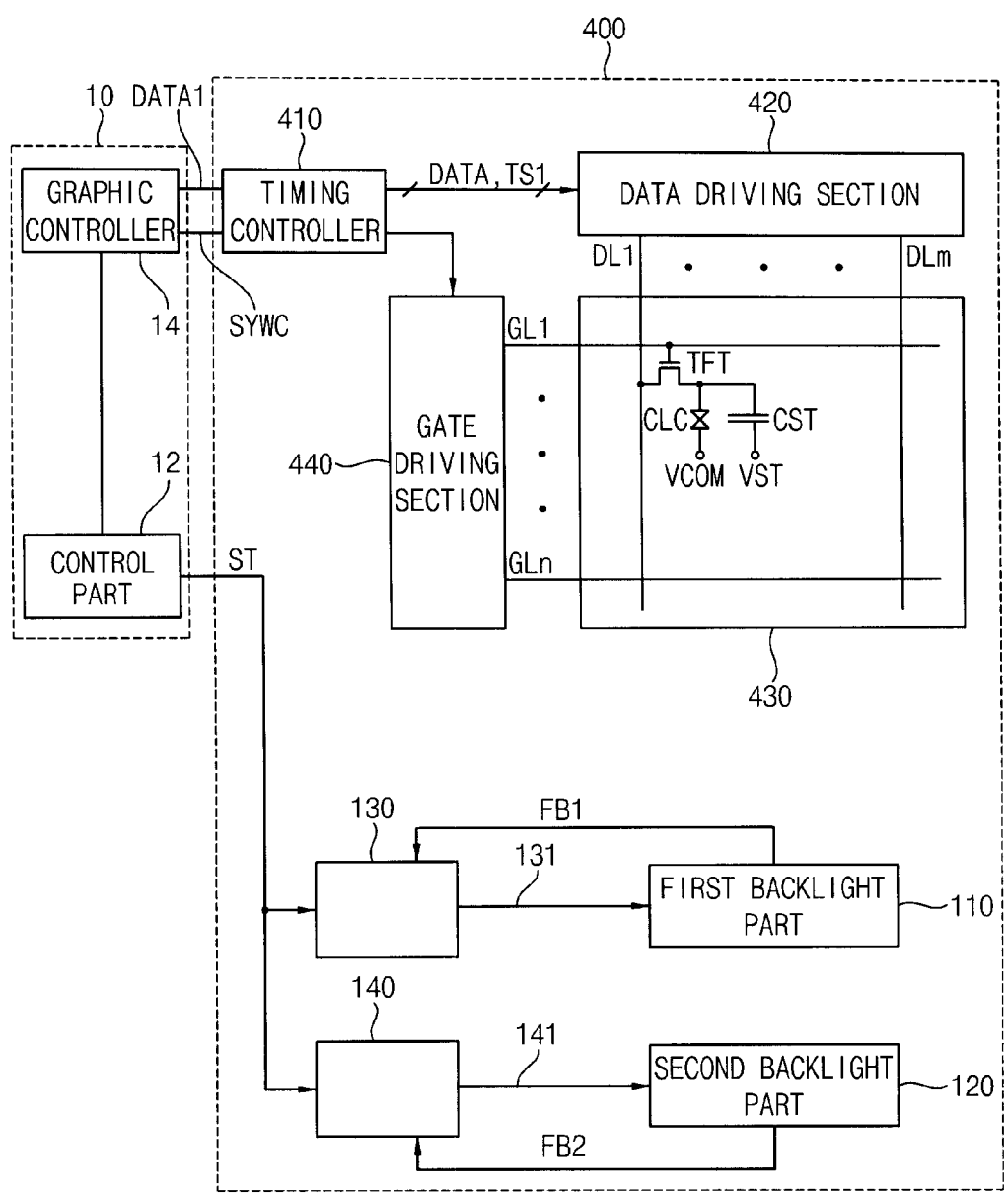
FIG. 3 is a block diagram of a liquid crystal display ("LCD") apparatus according to an exemplary of the present invention.

FIG. 3 is a block diagram of an LCD apparatus 400 according to an exemplary embodiment of the present invention.

Referring to FIG. 3, the LCD apparatus 400 includes a timing controller 410, a data driving section 420, an LCD panel 430, a gate driving section 440, a first backlight part 110, a second backlight part 120, a first backlight controller 130 and a second backlight controller 140, and displays an image (not shown) provided from a computer part 10.

The computer part 10 includes a control part 12 and a graphic controller 14. The control part 12 provides the first backlight controller 130 and the second backlight controller 140 with a start signal ST which activates an operation the LCD apparatus 400. The graphic controller 14 provides the timing controller 410 with a first image signal DATA1 and a synchronizing signal SYNC. The synchronizing signal SYNC includes a horizontal synchronizing signal Hsync (not shown) and a vertical synchronizing signal Vsync (not shown). The vertical synchronizing signal Vsync represents a time required for displaying one frame field. The horizontal synchronizing signal Hsync represents a time required for displaying one line of the field. Thus, the horizontal synchronizing signal Hsync includes a plurality of pulses corresponding to a number of pixels included in one line.

The timing controller 410 receives the first image signal DATA1 and the synchronizing signal SYNC from the graphic controller 14, e.g., an external host system. The timing controller 410 outputs a second image signal DATA2 and a first control signal TS1 to the data driving section 420.

The synchronizing signal SYNC includes the vertical synchronizing signal Vsync, the horizontal synchronizing signal Hsync, a main clock MCLK signal (not shown) and a data enable signal DE (not shown). The data enable signal DE represents a time required for supplying a pixel (not shown) with data. The first control signal TS1 includes a load signal LOAD (not shown) for outputting the second image signal DATA2, a horizontal start signal STH (not shown) and a polarity control signal REV (not shown). The second control signal TS2 includes a gate clock signal CPV (or GLK) (neither shown) and a vertical start signal STV (not shown).

The data driving section 420 provides the LCD panel 430 with a plurality of data voltages based on the second image signal DATA2 and the first control signal TS1.

In an exemplary embodiment, the data driving section 420 may be mounted on a printed circuit board ("PCB"), a flexible PCB ("FPCB") electrically connected to the PCB, and/or on one or more data driving chips mounted on the FPCB, but alternative exemplary embodiments are not limited thereto. For example, in an alternative exemplary embodiment, the data driving section 420 may be mounted on a peripheral area of the LCD panel 430.

The LCD panel 430 includes a plurality of gate lines GL1 through GLn, a plurality data lines DL1 through DLm, a thin-film transistor ("TFT") formed on an area surrounded by adjacent gate lines and adjacent data lines, a liquid crystal capacitor Clc electrically connected to the TFT and a storage capacitor Cst electrically connected to the TFT.

In operation, a gate line GL of the gate lines GL1 through GLn transfers a gate voltage to the TFT. A data line DL of the data lines DL1 through DLm transfers the data voltage to the TFT. The liquid crystal capacitor Clc is charged with the data voltage based on the gate voltage. The storage capacitor Cst charges to the data voltage when the TFT is turned on, and provides the liquid crystal capacitor Clc with the charged data voltage during a turned-off time interval of the TFT.

The gate driving section 440 sequentially provides the LCD panel 430 with a plurality of gate voltages. The gate driving section 440 includes, for example, a PCB, a FPCB electrically connected to the PCB, and one or more gate driving chips mounted on the FPCB, but alternative exemplary embodiments are not limited thereto. For example, the gate driving section 440 may include a FPCB and one or more gate driving chips mounted on the FPCB, or, alternatively, the gate driving section 440 may be mounted on a peripheral area of the LCD panel 430.

The first backlight part 110 and the second backlight part 120 were explained in greater detail with reference to FIGS. 1 and 2, and repetitive explanation thereof has been omitted.

The first backlight controller 130 provides the first backlight part 110 with a first driving signal 131 based on a start signal ST provided from the control part 12 and a first feedback signal FB1 provided from the first backlight part 110. In an exemplary embodiment, the first backlight controller 130 is substantially the same as described above in greater detail with reference to FIGS. 1 and 2. Thus, the same reference numerals will be used to refer to the same or like parts as those in FIGS. 1 and 2, and any repetitive explanation concerning the same or like parts will hereinafter be omitted.

In an exemplary embodiment, the first feedback signal FB1 includes a first voltage feedback signal 110_V and a first current feedback signal 110_C, as described above in greater detail.

The second backlight controller 140 provides the second backlight part 120 with a second driving signal 141 based on the start signal ST provided from the control part 12 and a second feedback signal FB2 provided from the second backlight part 120. The second backlight controller 140 is substantially the same as described above in greater detail with reference to FIGS. 1 and 2. Thus, the same reference numerals will be used to refer to the same or like parts as those in FIGS. 1 and 2, and any repetitive explanation thereof will hereinafter be omitted.

In an exemplary embodiment, the second feedback signal FB2 includes a second voltage feedback signal 120_V and a second current feedback signal 120_C.

Figure 4:
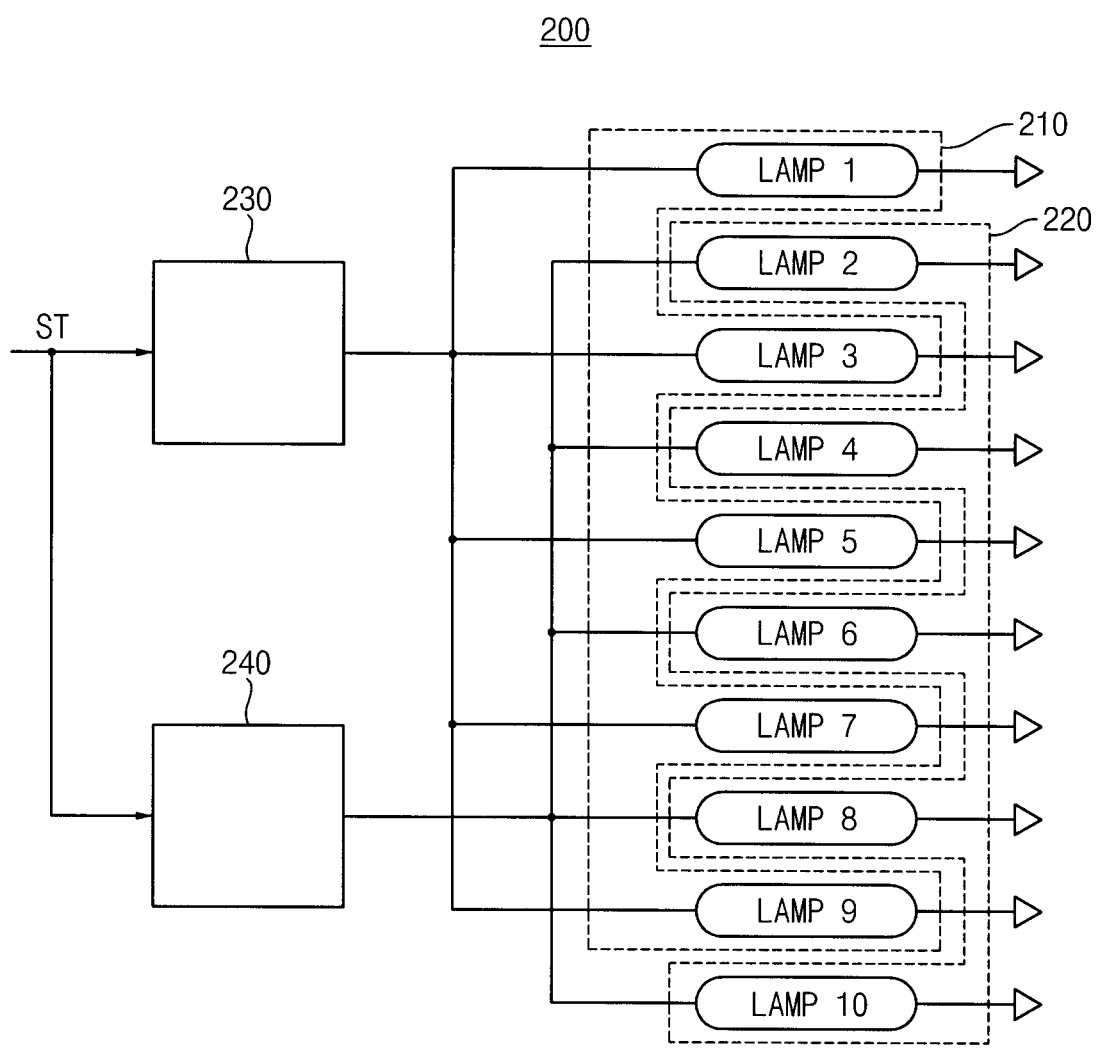
FIG. 4 is a schematic diagram of a backlight apparatus according to an alternative exemplary embodiment of the present invention.

FIG. 4 is a schematic diagram of a backlight apparatus 200 according to an alternative exemplary embodiment of the present invention.

Referring to FIG. 4, the backlight apparatus 200 includes a first backlight part 210, a second backlight part 220, a first backlight controller 230 and a second backlight controller 240.

The first backlight part 210 includes a plurality of lamps, e.g., the odd-numbered lamps shown in FIG. 4, each of which emits light in response to power provided from the first backlight controller 230. Each lamp of the lamps includes a first terminal electrically connected to the first backlight controller 230 and a second terminal electrically connected to ground.

The second backlight part 220 includes a plurality of lamps, e.g., the even-numbered lamps shown in FIG. 4, each of which outputs light in response to power provided from the second backlight controller 240. Each lamp of the lamps includes a first terminal connected to the second backlight controller 240 and a second terminal electrically connected to ground. As shown in FIG. 4, lamps of respective pluralities of lamps disposed in the first backlight part 210 and the second backlight part 220, respectively, are disposed in an alternating arrangement, e.g., each lamp of the lamps of the first backlight part 210 is next to a lamp of the lamps of the second backlight part 220, as shown in FIG. 4.

The first backlight controller 230 provides the first backlight part 210 with power for driving the lamps thereof based on a start signal ST provided from an external device (not shown). In an exemplary embodiment, the first backlight controller 230 provides the power to the first backlight part 210 based on a first feedback signal (not shown) which indicates whether the power is provided to the first backlight part 210.

The second backlight controller 240 provides the second backlight part 220 with a power for driving the lamps based on the start signal ST independently provided from a driving of the first backlight controller 230. The second backlight controller 240 provides the power to the second backlight part 220 based on a second feedback signal (not shown) which indicates whether the power is provided to the second backlight part 220.

In a display apparatus of the prior art, a luminance uniformity of the backlight assembly is decreased due, e.g., to variations of a lamp tube current generated by each of backlight parts, a rising time of a PWM signal or when a backlight part is shut down. However, according to an exemplary embodiment of the present invention, the lamps disposed in the first backlight part 210 and the second backlight part 220 are disposed in the alternating arrangement described in greater detail above, and the backlight apparatus provide the LCD panel 430 (FIG. 3) with uniform light even when one of the first backlight part 210 and the second backlight part 220 is shutdown. Therefore, an improved luminance uniformity of the LCD apparatus is achieved in an exemplary embodiment of the present invention.

Figure 5:
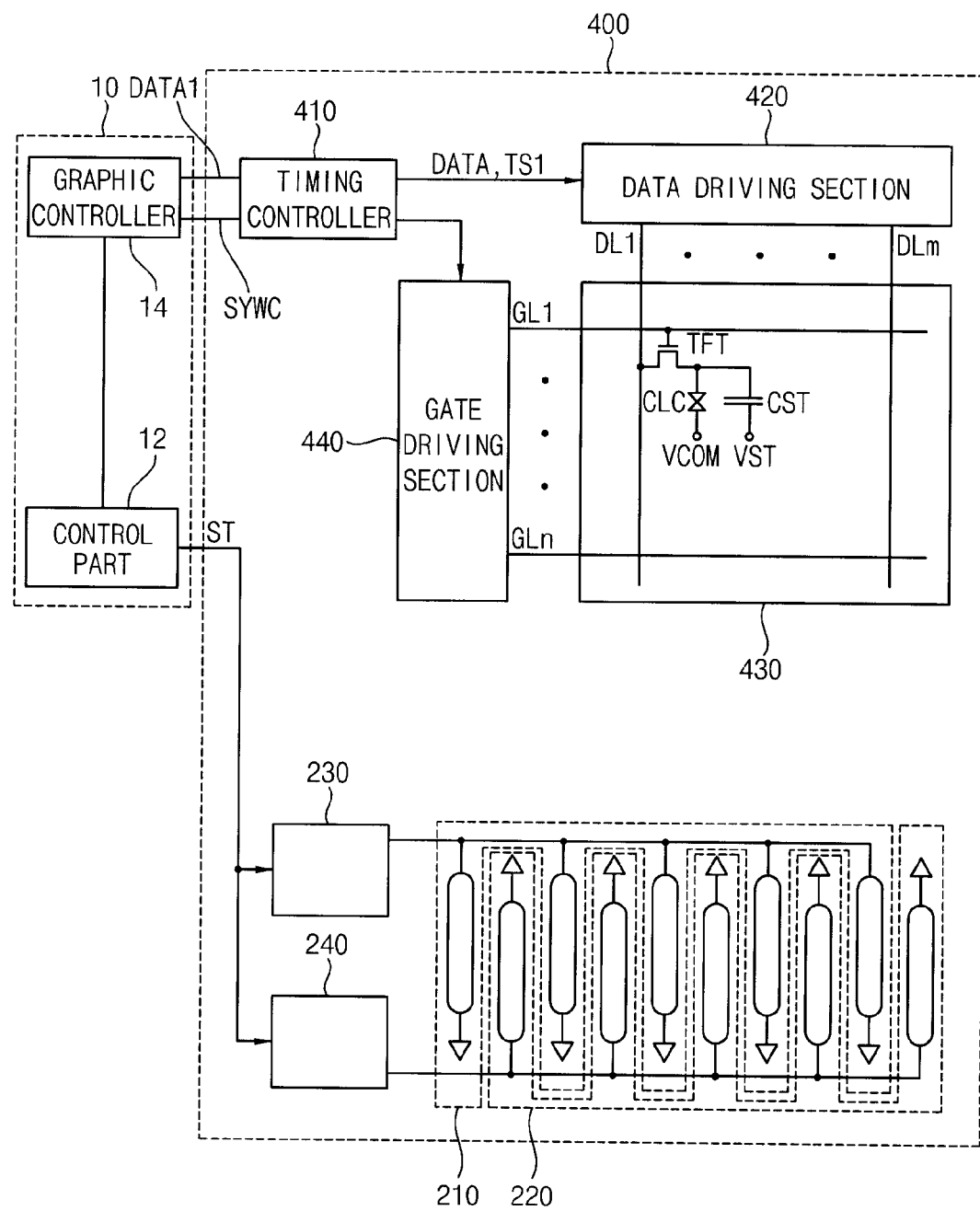
FIG. 5 is a block diagram of an LCD apparatus according to an alternative exemplary embodiment of the present invention.

FIG. 5 is a block diagram of an LCD apparatus 400 according to an alternative exemplary embodiment of the present invention.

The same reference numerals will be used to refer to the same or like parts in FIG. 5 as those in FIG. 3, and any repetitive explanation thereof will hereinafter be omitted. Likewise, the first backlight part 210, the second backlight part 220, the backlight controller 230 and the second backlight controller 240 are described in further detail in FIG. 4. Thus, any repetitive explanation thereof will also be omitted.

Referring to FIG. 5, the LCD apparatus 400 includes the timing controller 410, the data driving section 420, the LCD panel 430, the gate driving section 440, the first backlight part 210, the second backlight part 220, the first backlight controller 230 and the second backlight controller 240, and displays an image provided from the computer part 10.

As described above, the LCD apparatus 400 according to an exemplary embodiment of the present invention includes the odd-numbered lamps of the first backlight part 210 and the even-numbered lamps of the second backlight part 220 disposed in an alternating arrangement. As a result, the LCD apparatus 400 maintains a uniform light to display images when one of the first backlight part 210 and the second backlight part 220 is shut down. Therefore, luminance uniformity of the LCD apparatus 400 according to an exemplary embodiment is thereby substantially increased.

Figure 6:
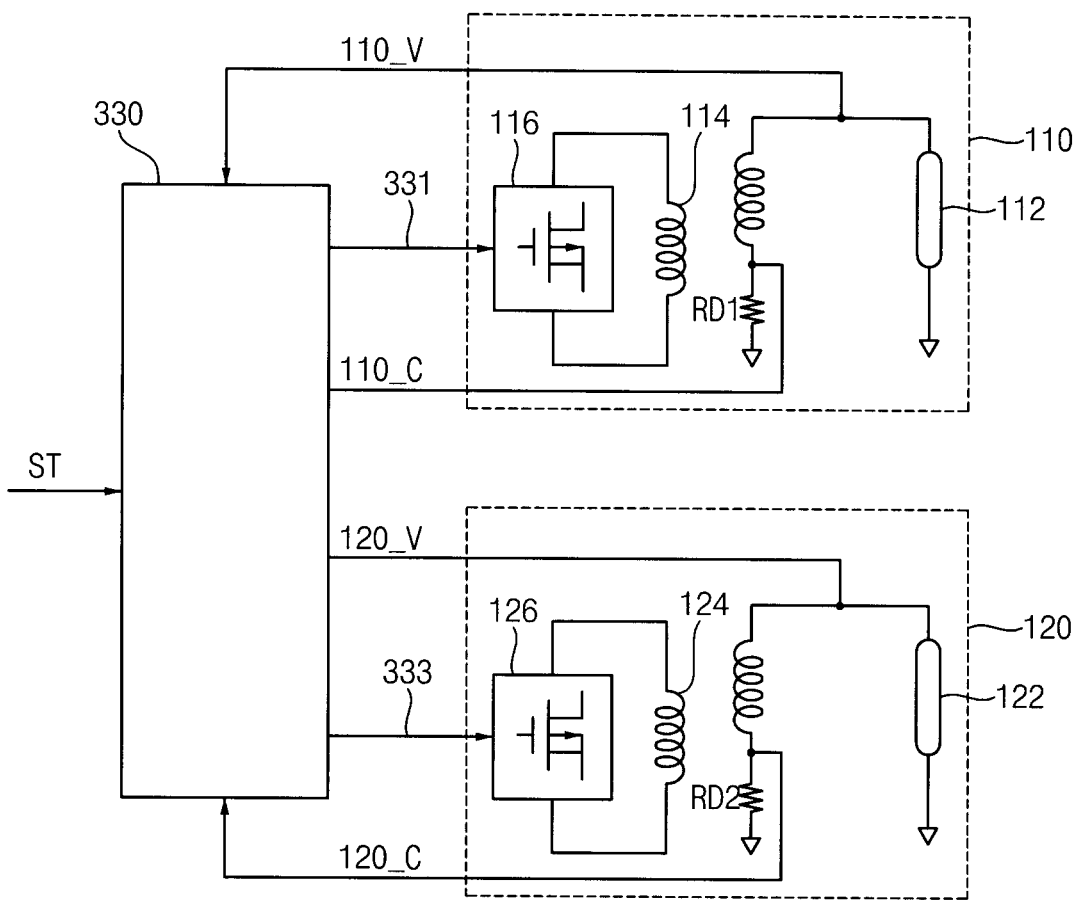
FIG. 6 is a schematic diagram of a backlight apparatus according to yet another exemplary embodiment of the present invention.

FIG. 6 is a schematic diagram of a backlight apparatus 300 according to yet another exemplary embodiment of the present invention. The same reference numerals will be used to refer to the same or like parts in FIG. 6 as those in FIG. 1, and any repetitive explanation thereof will hereinafter be omitted.

Referring to FIG. 6, the backlight apparatus 300 includes the first backlight part 110, the second backlight part 120 and a backlight controller 330. The backlight controller 330 provides the first backlight part 110 with a first driving signal 331, and provides the second backlight part 120 with a second driving signal 333 based on a start signal ST provided from an external device (not shown), a first feedback signal provided from the first backlight part 110, and a second feedback signal provided from the second backlight part 120.

As described above in greater detail, the first feedback signals include the first voltage feedback signal 110_V and the first current feedback signal 110_C.

The first voltage feedback signal 110_V is detected at the node between the first terminal of the secondary coil of the first transformer part 114 and the first lamp 112. The first current feedback signal 110_C is detected at the node between the second terminal of the secondary coil of the first transformer part 114 and the first detecting resistor RD1.

In an alternative exemplary embodiment, the first detecting resistor RD1 may be electrically connected to a cold electrode of the first lamp 112 disposed in the first backlight part 110. Accordingly, the first current feedback signal 110_C is then detected at a node between the cold electrode of the first lamp 112 and the first detecting resistor RD1.

The second feedback signals include the second voltage feedback signal 120_V and the second current feedback signal 120_C. The second voltage feedback signal 120_V is detected at the node between the first terminal of the secondary coil of the second transformer part 124 and the second lamp 122. The second current feedback signal 120_C is detected at the node between the second terminal of the secondary coil of the second transformer part 124 and the second detecting resistor RD2.

In an alternative exemplary embodiment, the second detecting resistor RD2 may be electrically connected to a cold electrode of the second lamp 122 disposed in the second backlight part 120. Accordingly, the second current feedback signal 120_C is then detected at a node between the cold electrode of the second lamps 122 and the second detecting resistor RD2.

Figure 7:
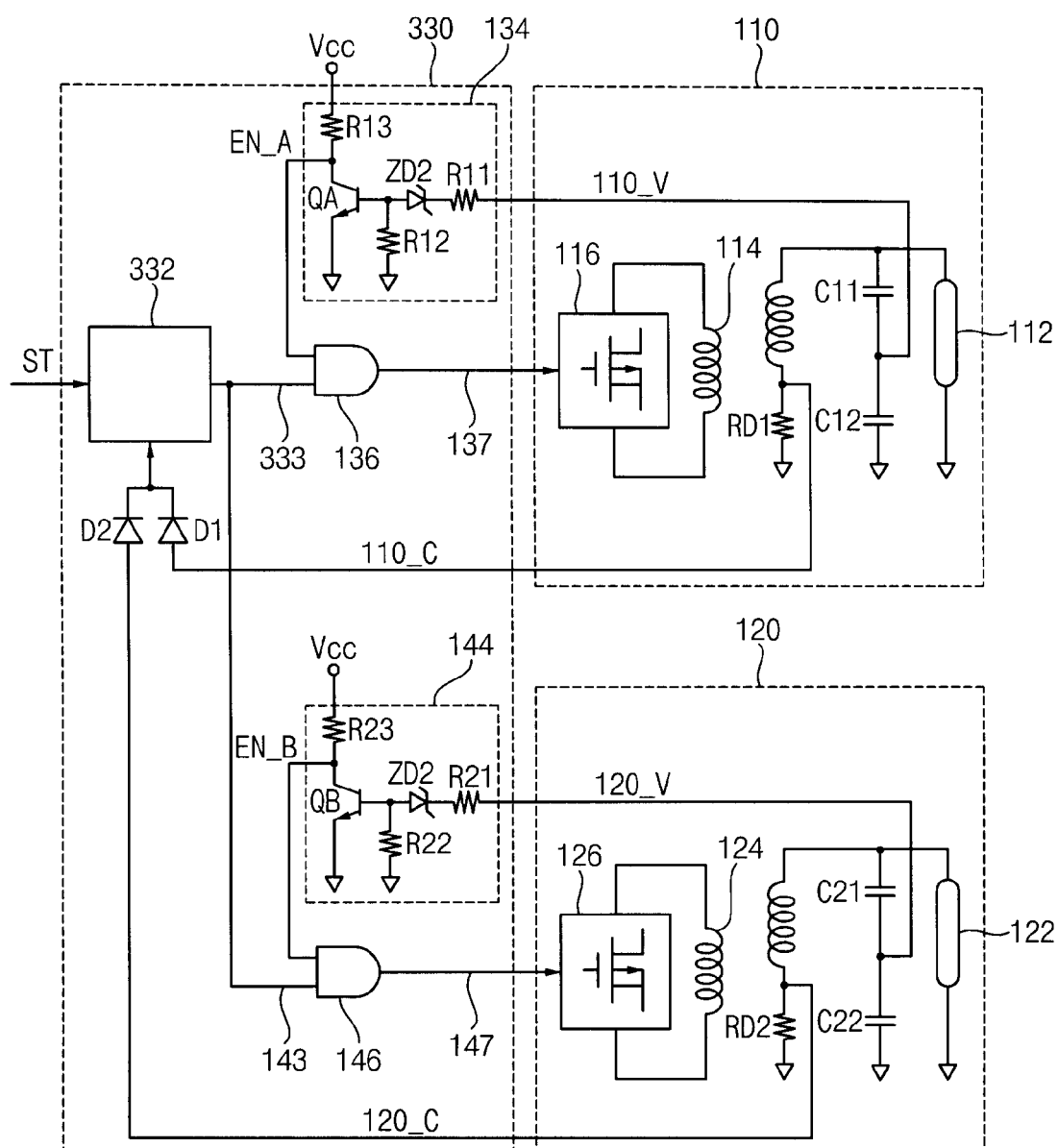
FIG. 7 is a schematic diagram of the backlight apparatus according to the alternative exemplary embodiment of the present invention shown in FIG. 6.

FIG. 7 is a schematic diagram of the backlight apparatus 300 according to the alternative exemplary embodiment of the present invention shown in FIG. 6. The same reference numerals will be used to refer to the same or like parts in FIG. 7 as those in FIG. 2, and any repetitive explanation thereof will be omitted.

Referring to FIG. 7, the backlight apparatus 300 includes the first backlight part 110, the second backlight part 120 and the backlight controller 330.

The backlight controller 330 provides the first backlight part 110 and the second backlight part 120 with a first driving signal 137 and a second driving signal 147, respectively, based on a start signal ST provided from an external device (not shown), first feedback signals provided from the first backlight part 110 and second feedback signals provided from the second backlight part 120. The first feedback signal includes the first voltage feedback signal 110_V and the first current feedback signal 110_C. The second feedback signal includes the second voltage feedback signal 120_V and the second current feedback signal 120_C.

In an exemplary embodiment, the backlight controller 330 includes a backlight inverter IC 332, the first feedback signal detecting part 134, the second feedback signal detecting part 144, the first AND gate 136 and the second AND gate 146.

The backlight inverter IC 332 receives the start signal ST, the first current feedback signal 110_C provided from the first backlight part 110 and the second current feedback signal 120_C provided from the second backlight part 120, and provides the first AND gate 136 and the second AND gate 146 with a driving control signal 333 and a driving control signal 343, respectively. In an exemplary embodiment, the driving control signal 333 includes a PWM signal. As described above, the first current feedback signal 110_C is provided to the first AND gate 136 through the first diode D1, and the second current feedback signal 120_C is provided to the second AND gate 146 through a second diode D2.

The first AND gate 136 performs an AND operation on the driving control signal 333 provided from the backlight inverter IC 332 and the first enable signal EN_A provided from the first feedback signal detecting part 134 to provide the first power providing part 116 of the first backlight part 110 with the first driving signal 137.

The second AND gate 146 performs an AND operation on the driving control signal 343 provided from the backlight inverter IC 332 and the second enable signal EN_B provided from the second feedback signal detecting part 144 to provide the second power providing part 126 of the second backlight part 120 with the second driving signal 147.

In operation, when the first lamp 112, malfunctions, e.g., is opened or damaged, a level of the first voltage feedback signal 110_V increases.

When the first voltage feedback voltage 110_V having the increased value is greater than a zener voltage Vz of the first zener diode ZD1, the first BJT QB is turned on and a voltage level of the first enable signal EN_A is thereby shifted to a low level.

Accordingly, the first AND gate 136 outputs the first driving signal 137 at a low level, and the first backlight part 110 having the opened or broken lamp 112 is thereby shut down.

When the second lamp 122 malfunctions, e.g., is opened or broken, a level of the second voltage feedback signal 120_V increases.

When the second voltage feedback voltage 120_V having the increased level is greater than a zener voltage Vz of the second zener diode ZD2, the second BJT QB is turned on and a voltage level of the second enable signal EN_B is thereby shifted to a low level.

Accordingly, the second AND gate 146 outputs the second driving signal 147 at a low level, and the second backlight part 120 having the opened or broken second lamp 122 is thereby shut down.

In an exemplary embodiment, the first and feedback signal detecting part 134 and the second feedback detecting part 144, the first AND gate 136, and the second and gate 146 are separate from the backlight inverter IC 332. In an alternative exemplary embodiment, however, the first feedback signal detecting part 134, the second feedback signal detecting part 144, the first AND gate 136 and the second AND gate 146 may be integrally formed in the backlight inverter IC 332.

In an exemplary embodiment, the backlight controller 330 includes a zener diode, a BJT and an AND gate. Therefore, a manufacturing cost of the backlight apparatus 300 is substantially decreased. In addition, one backlight inverter IC 332 effectively controls two backlight parts, and a manufacturing cost for the backlight apparatus is thereby further decreased.

Figure 8:
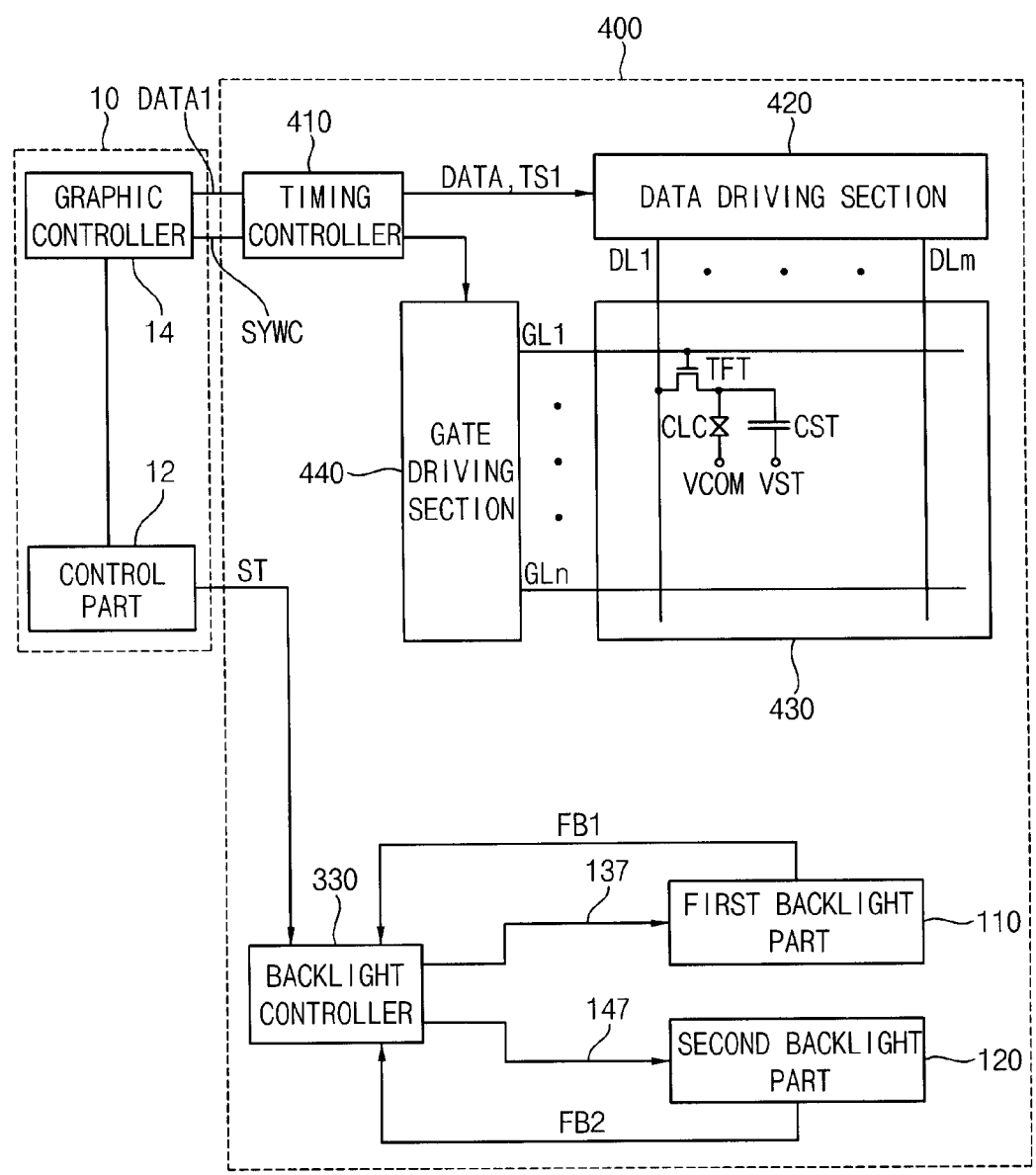
FIG. 8 is a block diagram of an LCD apparatus according to still another exemplary embodiment of the present invention.

FIG. 8 is a block diagram of an LCD apparatus 400 according to still another alternative exemplary embodiment of the present invention. The same reference numerals will be used to refer to the same or like parts in FIG. 8 as those in FIG. 3, and any repetitive explanation thereof will be omitted.

Referring to FIG. 8, the LCD apparatus 400 includes the timing controller 410, the data driving section 420, the LCD panel 430, the gate driving section 440, the first backlight part 110 and the second backlight part 120, and displays an image provided from the computer part 10. The backlight controller 330 provides the first backlight part 110 and the second backlight part 120 with a first driving signal 137 and a second driving signal 127, respectively, based on the start signal ST provided from the control part 12, the first feedback signal FB1 provided from the first backlight part 110 and the second feedback signal FB2 provided from the second backlight part 120. The backlight controller 330 is substantially the same as described in greater detail above with reference to FIGS. 6 and 7. Thus, the same reference numerals are used in FIG. 8 to refer to the same or like components in FIGS. 6 and 7, and thus any repetitive description thereof will be omitted. The first feedback signal FB1 includes the first voltage feedback signal 110_V and the first current feedback signal 110_C as explained in further detail above with reference to FIGS. 6 and 7. The second feedback signal FB2 includes the second voltage feedback signal 120_V and the second current feedback signal 120_C as explained in further detail above with reference to FIGS. 6 and 7.

Likewise, the first backlight part 110 is substantially the same as described above with reference to FIGS. 6 and 7. Thus, the same reference numerals are used in FIG. 8 to refer to the same or like components as those in FIGS. 6 and 7, and any repetitive description thereof will be omitted.

The second backlight part 120 emits light based on the second driving signal 147 provided from the backlight controller 330, and provides the backlight controller 330 with the second feedback signal FB2. The second backlight part 120 is substantially the same as described above with reference to FIG. 5. Thus, the same reference numerals are used in FIG. 8 to refer to the same or like components in FIG. 5, and any repetitive detailed description thereof will be omitted.

Thus, as described herein, an exemplary embodiment of the present invention provides a plurality of backlight parts independently driven, e.g., driven separately from each other. Thus, even when a lamp disposed in one backlight part is damaged or opened, remaining backlight parts continue to operate, and the backlight apparatus according to an exemplary embodiment of the present invention continuously provides an LCD panel of an LCD device with light.

Further, lamps disposed in each respective backlight part are disposed in an alternating arrangement, and the backlight apparatus according to an exemplary embodiment of the present invention provides the LCD panel with uniform light even when one of the backlight parts is shut down.

Therefore, the LCD apparatus according to an exemplary embodiment has an advantage of a uniform luminance.

The present invention should not be construed as being limited to the exemplary embodiments set forth herein. Rather, these exemplary embodiments are provided so that this disclosure will be thorough and complete and will fully convey the concept of the present invention to those skilled in the art.

While the present invention has been particularly shown and described with reference to exemplary embodiments thereof, it will be understood by those of ordinary skill in the art that various changes in form and details may be made therein without departing from the spirit or scope of the present invention as defined by the following claims.

What is claimed is:
1. A Backlight Apparatus comprising:
a first backlight part comprising a plurality of first lamps;
a second backlight part is disposed between at least two second lamps of the second backlight par; and
a backlight controller which drives independently the first backlight part and the second backlight part by providing a first driving signal and a second driving signal to the plurality of first lamps and the plurality of second lamps, respectively, wherein the backlight controller drives the first backlight and the second backlight part such that one of the first backlight part and the second backlight part remains operational even when the other backlight part is shut down,
wherein the first lamps of the first backlight part and the second lamps of the second backlight part are disposed in an alternating arrangement such that the backlight apparatus provides uniform light even when the other backlight part is shut down,
wherein a first terminal of at least one of the plurality of first lamps and the plurality of second lamps is directly connected to a first terminal of a secondary coil of a transformer part and a second terminal of the at least one of the plurality of first lamps and the plurality of second lamps is directly connected to a ground, and a second terminal of the secondary coil comprises two ends, one end of the second terminal of the secondary coil is connected to the ground via a detecting resistor, and the other end of the second terminal of the secondary coil is connected to the ground via a detecting resistor, and the other end of the second terminal of the secondary coil is directly connected to the backlight controller to provide a current feedback signal;

a backlight inverter inverter integrated chip which outputs a driving control signal based on the current feedback signal;

a feedback signal detecting part which detects a voltage feedback signal and outputs a power detecting signal based on the detected voltage feedback signal; and an AND gate which generates at least one of the first driving signal and the second driving signal based on the driving control signal and the power detecting signal and provides the at least one of the first driving and the second driving signal to at least one of the first backlight part and the second backlight part, respectively.

2. The backlight apparatus of claim 1, wherein the driving control signal comprises a pulse width modulation signal.

3. The backlight apparatus of claim 1, wherein the backlight controller further comprises a diode which receives the current feedback signal from one of the first backlight part and the second backlight part and provides the received current feedback signal to the backlight inverter integrated chip.

4. The backlight apparatus of claim 1, wherein the feedback signal detecting part comprises:
a zener diode having a cathode and which receives the voltage feedback signal of the one of the first feedback signal and the second feedback signal through the cathode; and
a bipolar junction transistor comprising:
a base electrically connected to an anode of the zener diode;
an emitter electrically connected to ground; and
a collector electrically connected to a static voltage source and an input terminal of the AND gate.

5. The backlight apparatus of claim 1, wherein the first backlight part and the second backlight part further comprise:
a power providing part electrically connected to the backlight controller; and
the transformer part electrically connected to the power providing part,
wherein the transformer part provides a power from the power providing part to one of the first lamps and the second lamps.

6. A liquid crystal display apparatus comprising:
a liquid crystal display section which displays an image using a liquid crystal layer; and
a backlight apparatus comprising:
a first backlight part comprising a plurality of first lamps;
a second backlight part comprising a plurality of second lamps, wherein at least one first lamp of the first backlight part is disposed between two second lamps of the second backlight part; and
a backlight controller which drives independently the first backlight part and the second backlight part by providing a first driving signal and a second driving signal to the plurality of first lamps and the plurality of second lamps, respectively, wherein the backlight controller drives the first backlight part and the second backlight part such that one of the first backlight part and the second backlight part such that one of the first backlight part and the second backlight part remains operational even when the other backlight part is shut down,
wherein the first lamps of the first backlight part and the second lamps of the second backlight part are disposed in an alternating arrangement such that the backlight apparatus provides uniform light even when the other backlight part is shut down,
wherein a first terminal of at least one of the plurality of first lamps and the plurality of second lamps is directly connected to a first terminal of a secondary coil of transforming part and a second terminal of the at least one of the plurality of first lamps and the plurality of second lamps is directly connected to a ground, and a second terminal of the secondary coil comprises two ends, one end of the second terminal of the secondary coil is connected to the ground via a detecting resistor, and the other end of the second terminal of the secondary coil is directly connected to the backlight controller to provide a current feedback signal;

a backlight inverter integrated chip which outputs a driving control signal based on the current feedback signal;

a feedback signal detecting part which detects a voltage feedback signal and outputs a power detecting signal based on the detected voltage feedback signal; and an AND gate which generates at least one of the first driving signal and the second driving signal based on the driving control signal and the power detecting signal and provides the at least one of the first driving signal and the second driving signal to at least one of the first backlight part and the second backlight part, respectively.

7. The liquid crystal display apparatus of claim 6, wherein the feedback signal detecting part comprises:
a zener diode having a cathode and which receives the voltage feedback signal of the one of the first feedback signal and the second feedback signal through the cathode; and
a bipolar junction transistor comprising:
a base electrically connected to an anode of the zener diode;
an emitter electrically connected to ground; and
a collector electrically connected to a static voltage source and an input terminal of the AND gate.

8. The liquid crystal display apparatus of claim 6,
wherein the first backlight part and the second backlight part further comprise:
a power providing part electrically connected to the backlight controller; and the transforming part electrically connected to the power providing part,
wherein the transformer part provides a power form the power providing part to one of the first lamps and the second lamps.

* * * * *